United States Patent
Kemp et al.

(10) Patent No.: US 6,822,634 B1
(45) Date of Patent: Nov. 23, 2004

(54) SYSTEM COMPRISING A HANDHELD CONTROL DEVICE

(75) Inventors: Johannes A. M. Kemp, Mountain View, CA (US); Hok K. Tang, Eindhoven (NL); Peter Meyer, Furth (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 939 days.

(21) Appl. No.: 08/609,875

(22) Filed: Mar. 1, 1996

(30) Foreign Application Priority Data

Mar. 3, 1995 (EP) .............................................. 95200531

(51) Int. Cl.[7] ................................................ G09G 5/00
(52) U.S. Cl. ........................................ 345/156; 341/22
(58) Field of Search ................................. 345/156, 169, 345/123, 1, 5, 157, 902, 830, 829; 341/21, 22; 364/709.11, 709.12

(56) References Cited

U.S. PATENT DOCUMENTS

| | | | | |
|---|---|---|---|---|
| 4,561,049 A | * | 12/1985 | Deleganes et al. | 345/123 |
| 4,712,105 A | * | 12/1987 | Kohler | 340/825.69 |
| 4,858,122 A | * | 8/1989 | Kreisner | 364/27 |
| 5,046,086 A | * | 9/1991 | Bergen et al. | 379/164 |
| 5,327,160 A | * | 7/1994 | Asher | 345/156 |
| 5,432,510 A | * | 7/1995 | Matthews | 364/709.12 |
| 5,442,378 A | * | 8/1995 | Yasuhara et al. | 345/168 |
| 5,477,508 A | * | 12/1995 | Will | 368/189 |
| 5,546,106 A | * | 8/1996 | Walgers | 345/157 |
| 5,627,531 A | * | 5/1997 | Posso et al. | 345/902 |
| 5,677,949 A | * | 10/1997 | Macor | 341/22 |
| 5,684,511 A | * | 11/1997 | Westerink et al. | 345/157 |
| 5,686,940 A | * | 11/1997 | Kuga | 345/156 |
| 5,710,576 A | * | 1/1998 | Nishiyama et al. | 345/169 |

OTHER PUBLICATIONS

Beacham, Using Your Keyboard, Using WordPerfect 3rd Edition, pp. 31–43), 1987.*

* cited by examiner

*Primary Examiner*—Amare Mengistu

(57) ABSTRACT

A handheld control device of a system is coupled to a display screen comprising a number of lines. The device comprises a pushbutton for each line. The user can scroll through a series of possible contents of a line associated with a pushbutton, but only if the relevant pushbutton is depressed. Changing the contents of the line by the user thus becomes a coherent operation, so that the device will less readily respond to unintentional actuation of the controls.

10 Claims, 4 Drawing Sheets

SYSTEM COMPRISING A HANDHELD CONTROL DEVICE

TECHNICAL FIELD

This invention relates generally to menu-based selection systems, and, particularly, to menu-based selection systems for handheld devices.

BACKGROUND OF THE INVENTION

A prior art menu-based selection system includes control means provided with first and a second manual control member and a display screen, the control means being arranged
to scroll through a predetermined series of display items in response to actuation of the first manual control member and to identify visually, each time in response to a scrolling step, a next display item from the series on the display screen,
and to select the series of display items scrolled in response to actuation of the first manual control member from a predetermined plurality of different series of display items in response to an actuation of the second manual control member by a user. The actuation comprises, for example, exertion of a force on the second manual control member.

A system of this kind is known from U.S. patent application Ser. No. 07/949,283 (EP 535732; PHN 13.840). This system comprises a display screen with a number of fields in which information can be displayed. One of these fields is active at any given instant. For each field a series of display items is defined, for example symbols for different feasible parameter settings.

The first manual control member comprises a rotary knob. When the user turns this knob, the various display items defined for the relevant field are successively displayed in an active field on the display screen. When the rotary knob has been turned so far that a desired display item is displayed in the field, the user can depress a lock button. In response thereto, the system performs an operation which is dependent on the display item reached.

The second manual control member comprises a cursor control knob. By depressing this knob, different fields are activated in an alternating fashion. As a result, one rotary knob can readjust the active display item each time in another field. Finally, the user depresses the lock button.

The invention is concerned with accommodating such a user interface in a handheld control device such as a portable telephone or a remote control unit. Generally speaking, a handheld control device is intended to be actuated by the human user while being held in one hand, and its weight and format are usually such that it can indeed be held in one hand (for example, a weight of less than one kilogram and a width of less than ten cm). The user can thus hold the handheld control device in one hand while operating it with the other hand. After actuating, the handheld control device can be put down again or be stored.

During use of a handheld control device the risk of unintentional control actuations is greater than in the case of an installed device as published in EP 535732. Notably after a desired setting has been reached, unintentional rotation of the rotary knob may occur, for example when the device is stored. This may lead to an unintentional execution of an operation by the system which should be prevented by systematic use of the lock button. However, this necessitates an additional control actuation and an additional button.

SUMMARY OF THE INVENTION

It is inter alia an object of the invention to provide a system with a handheld control device in which the risk of unintentional control actuations is reduced without an additional control actuation or an additional button being required.

To this end, the system, in accordance with the invention, is characterized in that it comprises a handheld control device on which the first and the second manual control member are provided, and that the control means are arranged to switch from a scroll-disabled mode to a scroll-enabled mode and back in response to application and interruption, respectively, of the actuation of the second manual control member. The second manual control member comprises, for example a pushbutton or a touch button. Using a finger of the hand holding the handheld control device, the user depresses the pushbutton, thus selecting the series to be scrolled by the control means. This can continue for as long as the pushbutton remains depressed and is realised by actuating the first manual control member by means of the other hand. Further scrolling is disabled by releasing the pushbutton or the touch key.

Thus, scrolling requires at the same time actuation (for example application of a force) of the second manual control member and actuation of the first manual control member, said operations preferably being performed by different hands. This is handy notably when a handheld control apparatus is constructed so that a finger of the hand holding the handheld control device can exert the force; it would not be handy in an installed (i.e. not handheld) apparatus. Moreover, selection by depression by one hand and scrolling by way of the other hand is experienced as a single actuation by the user.

In an embodiment of the system in accordance with the invention, the first manual control member comprises a rotary disc and scrolling takes place in response to rotation of the rotary disc. A rotary knob allows the user to select the desired display item quickly, but is also susceptible to unintentional operation. Therefore, notably when a rotary knob is used it is advantageous to deactivate the control by interruption of the actuation of the first manual control member. Instead of the rotary knob, a pushbutton or touch button can also be used in the first manual control member. Each time when this pushbutton or touch button is actuated, the control means advance one display item. Such a button is less susceptible to unintentional operation than a rotary knob. Selection of the desired display item, however, requires more time.

In an embodiment of the system of the invention, a respective button in the second manual control member is associated with each series from said plurality, the series of display items being selected in response to actuation of the button corresponding to the relevant series. A series can thus be quickly selected for scrolling.

An embodiment of the system in accordance with the invention has exactly four of said respective buttons. Thus, with the exception of the thumb, each of the fingers of the hand holding the handheld control device can operate a respective button.

In an embodiment of the system in accordance with the invention the second manual control member comprises a first and a second button, a first series of display items being selected in response to actuation of the first button, each display item in said first series corresponding to a respective second series of display items, said respective second series being selected in response to actuation of the second button, after prior visual identification of the display item with which the series is associated as the last one in response to the scrolling step. Thus, a hierarchical menu structure is obtained. A second series is selected by depression of the first pushbutton, followed by scrolling to a display item. Scrolling within the selected second series can be performed by depressing the second pushbutton.

In an embodiment of the system in accordance with the invention a respective corresponding field on the display screen is displayed with each series from the plurality, the next display always being identified in the field corresponding to the relevant series. Thus, the actual display item in each of the series can be identified and at the same time the series to be scrolled can be selected by means of the associated pushbutton.

The display screen can be installed remote from the handheld control device, for example in a television set remote controlled by the handheld control device. In that case the handheld control device comprises means for implementing display of an image, for example a transmitter whereby instructions are transmitted to the television set. In an embodiment of the system of the invention the display screen is incorporated in the handheld control device. The handheld control device can thus be independently used.

In an embodiment of the system in accordance with the invention the corresponding fields form lines on the display screen which are arranged below one another, each corresponding button being arranged on the handheld control device so as to be adjacent to and in alignment with the associated line, viewed in a front view of the display screen. The relationship between the pushbuttons and the fields is thus directly visualized.

The invention also relates to handheld control devices incorporating the control means, for example a telephone handset and a remote control device for, for example a consumer apparatus such as a television set, a video recorder or an interactive computer.

These and other aspects of the invention will be apparent from and elucidated with reference to the embodiments described hereinafter.

DETAILED DESCRIPTION

Figure 1:
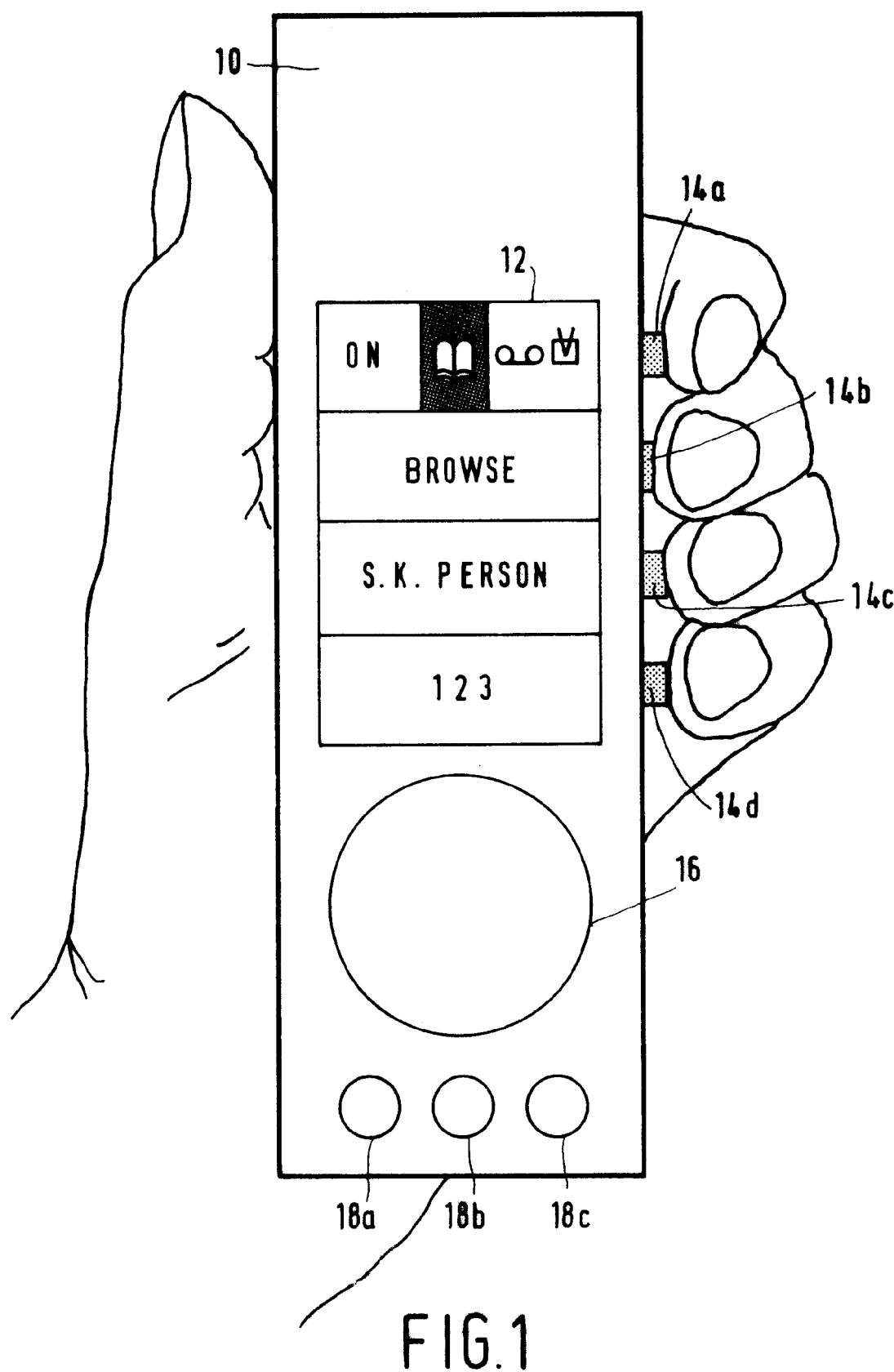
FIG. 1 is a front view of an embodiment of a handheld control device in accordance with the invention.

FIG. 1 is a front view of an embodiment of a handheld control device 10 in accordance with the invention. The handheld device comprises a display screen 12. By way of example, the display screen 12 comprises four lines of symbols. Adjacent to each line there is provided a respective pushbutton 14a–d. The handheld device also comprises a rotary knob 16 and a number of function keys 18a–c (three by way of example).

During use, the user holds the handheld control device 10, for example, in the left hand and activates it, for example by way of the key 18a. A setting of the apparatus is then displayed on the lines of the display screen 12. If the user wishes to change the setting displayed on a given line, he or she selects this line by depressing the pushbutton 14a–d provided adjacent the relevant line. By way of example, in FIG. 1 the second pushbutton 14b is shown to be depressed. As an alternative to pushbuttons 14a–d, touch sensitive buttons could be used.

When the user rotates the rotary knob 16, a number of symbols from a predetermined series appear successively in time on the selected line (the second line in the present example). The user can thus change the contents of the selected line by means of the rotary knob. The user turns the rotary knob 16 until a desired symbol is found. The user subsequently releases the depressed pushbutton 14b. As from that instant, turning the rotary knob 16 no longer affects the contents of any line on the display screen 12 until one of the pushbuttons 14a–d is depressed.

Conceptually speaking, the user experiences the operation by means of the pushbutton 14a–d and the rotary knob 16 as a coherent operation, because one hand continues to depress the button during rotation by the other hand, so that both operations cannot be separate in time.

After the user has thus induced visual identification of a desired display item, the selection of the relevant item can be confirmed, for example by depressing one of the function keys 18a–c. In response thereto, the system executes a function which is dependent on the selected display item. If the handheld device is a telephone, for example an adjusted number is dialled or, if the handheld apparatus is a remote control unit, a setting, for example the station whereto a television set is tuned, is changed.

Instead of the rotary knob 16, use could be made of a pair of further pushbuttons (not shown), depression of one pushbutton having the same effect as clock-wise rotation of the rotary knob 16 and depression of the other pushbutton having the same effect as counter-clockwise rotation. The control of a rotary knob, however, can be faster. Furthermore, the display screen 12 can also be provided on another apparatus within a system which is remote controlled by the handheld control device via a remote control protocol which is known per se. However, the relationship between the buttons and the lines on the display screen will then be less evident to the user, so that operating the handheld control device becomes more difficult.

Instead of the pushbuttons 14a–d, use can also be made of known buttons which respond to touching or of touch keys provided on the display screen 12. Furthermore, the function of the rotary knob 16 can also be implemented by means of a pair of touch keys provided on the display screen. In that case, however, it may be attractive to make brief touching suffice to select a line instead of demanding continuous touching. Otherwise, too many fingers must continue to touch the display screen simultaneously.

Figure 2:
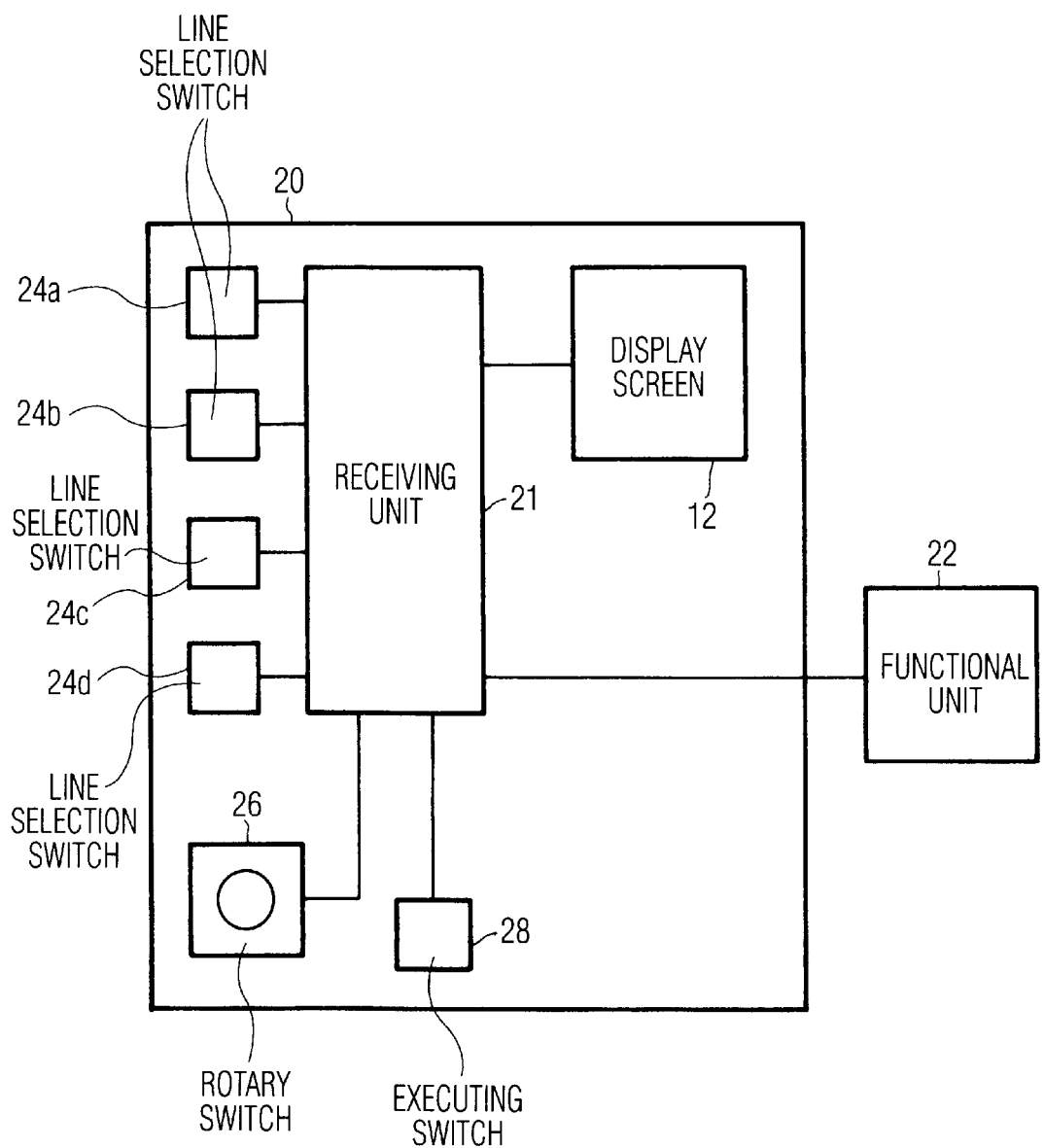
FIG. 2 shows a block diagram of an embodiment of a system in accordance with the invention.

FIG. 2 shows a block diagram of an embodiment of a system in accordance with the invention. The system comprises control means 20 and a functional section 22. The control means 20 comprise a number of line selection switches 24a–c and a rotary switch 26, all said elements being coupled to a receiving unit 21. The receiving unit 21 is also coupled to the display screen 12 and to the functional section 22. The control means 20 also comprise an execution switch 28 which is coupled to the functional section 22 via the receiving section 21.

Figure 3:
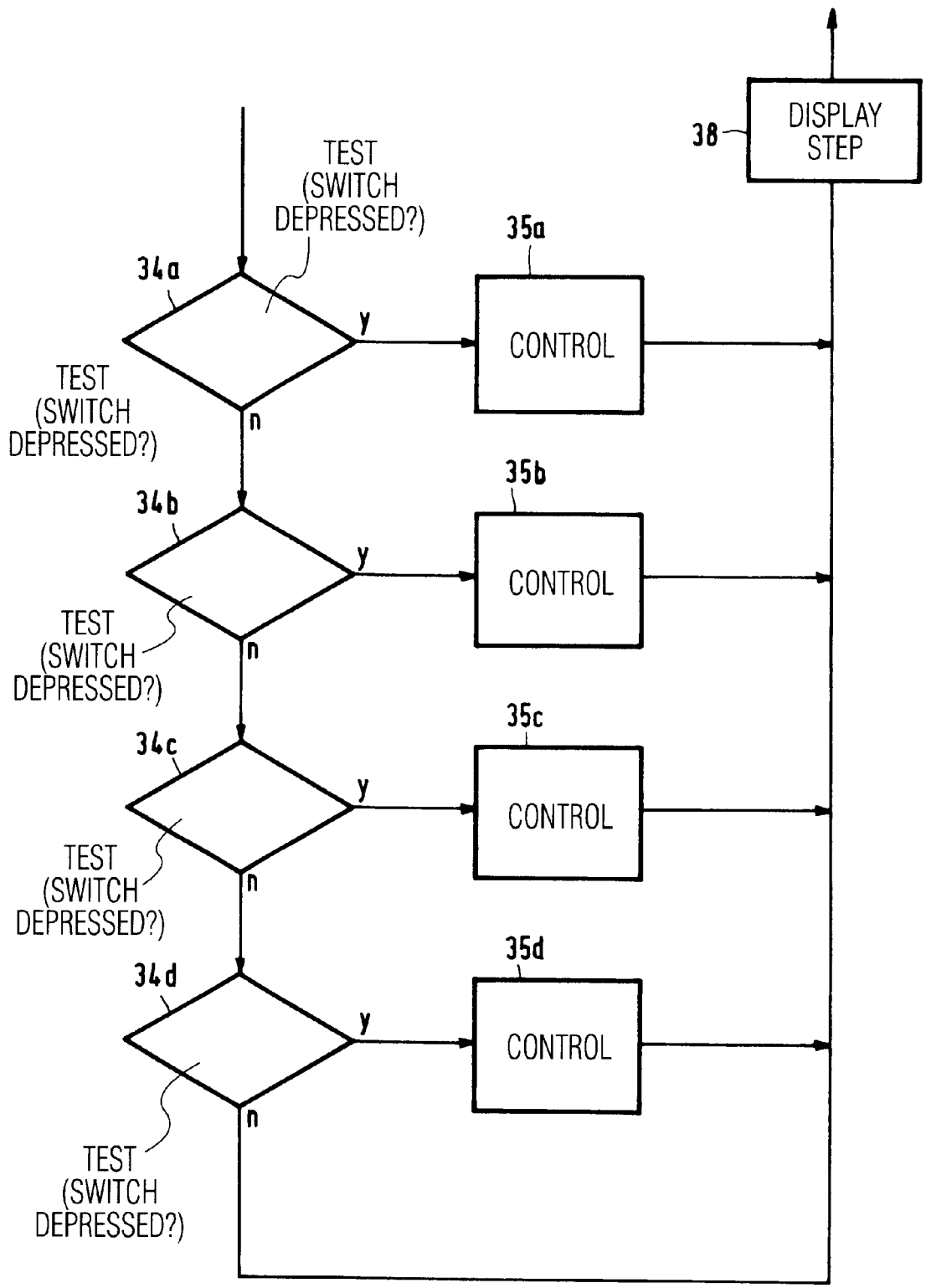
FIG. 3 shows a flow chart illustrating the operation of an embodiment of the system.

FIG. 3 shows a flow chart illustrating the operation of the system shown in FIG. 2. The flow chart is based on the assumption that there are four series of display items and that the control means 20 comprise a respective pointer for each of these series, which pointer indicates which display item is active in the relevant series. The control means 20 execute a program in conformity with the flow chart in response to a signal from the rotary switch 26, indicating that the rotary knob 16 has been turned.

For each switch 24a–d the flow chart comprises a test step 34a–d and a control step 35a–d. The flow chart also comprises a display step 38. The test step 34a–d tests whether the associated switch has been depressed. If this is the case, the associated control step 35a–d is executed and subsequently the display step 38. During the control step the pointer in the series associated with the relevant switch 24a–d is changed in conformity with the direction and possibly the amount of rotation of the rotary switch 26. For example, scrolling ahead takes place in the series of selectable display items when the rotary knob 16 is turned clockwise and scrolling back takes place when it is rotated counter-clockwise. For example, one step is taken per unit of time, or a number of steps proportional to a measured speed of rotation of the rotary knob; alternatively, the pointer is coupled to the position of the rotary knob.

If the test step 34a–d reveals that the associated switch 24a–d has not been depressed, a next test step is executed or, when all test steps have been executed, the display step 38 is executed.

During the display step 38 the contents of the display screen 12 are refreshed. Of all series associated with the switches 24a–d the display item pointed out by the pointer in the relevant series is identified.

When the display item desired by the user is identified on the display screen, the user can confirm the selection of the relevant item, for example by pressing the function key 18c, thus closing the execution switch 28. In response thereto, a signal is applied to the functional unit 22 which subsequently performs a function of the apparatus in conformity with the display item selected. The functional section 22 is, for example a dialling unit of a telephone set; in that case the functional unit 22 transmits, for example a selected telephone number, which has been identified on the display screen, to an exchange (not shown). If the functional section 22 is a television set, for example a parameter such as a station selection is replaced. The functional section 22 may also be a transmitter of a remote control device which transmits a command in dependence on the display item selected.

The flow chart of FIG. 3, evidently, is given merely by way of example and can be implemented, for example in a general purpose processor in the handheld control device. A variety of other versions of the invention are also possible, for example the use of interrupts in order to signal actuations of keys, or special purpose circuits.

If desired, all essential parts of the system can be accommodated in the handheld control device. However, it is alternatively possible to distribute the components within the system in a different manner; for example, the display screen can be accommodated in a further (for example, installed) apparatus. Part of the control means, such as information defining the various series of display items, can then also be accommodated in said installed apparatus.

The system in accordance with the invention can be used to control a hierarchical menu structure. This will be illustrated on the basis of a handheld telephone apparatus. By way of example, the upper layer of the menu structure contains four selections: "on", "telephone list", "answering apparatus" and "text messages".

When "on" is selected, a sub-menu with the selections "dial" and "redial" become available. When "dial" is selected, a further sub-menu becomes available for the selection of the digits.

When "telephone list" is selected, a sub-menu with the selections "browse" and "edit" becomes available (for browsing through a list of stored numbers and for updating this list, respectively). When "browse" is selected, a further sub-menu becomes available in which the stored numbers are browsed through, etc.

Figure 4:
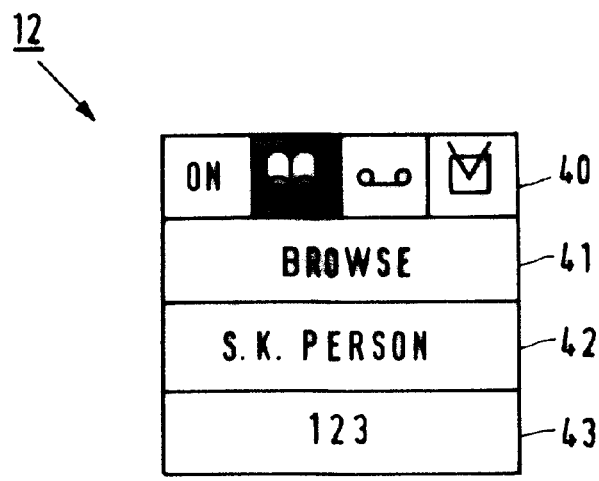
FIGS. 4, 5 and 6 show different contents of the display screen.
Figure 5:
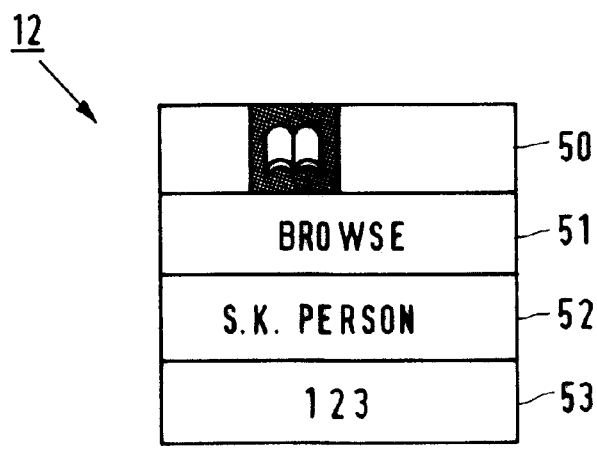
Figure 6:
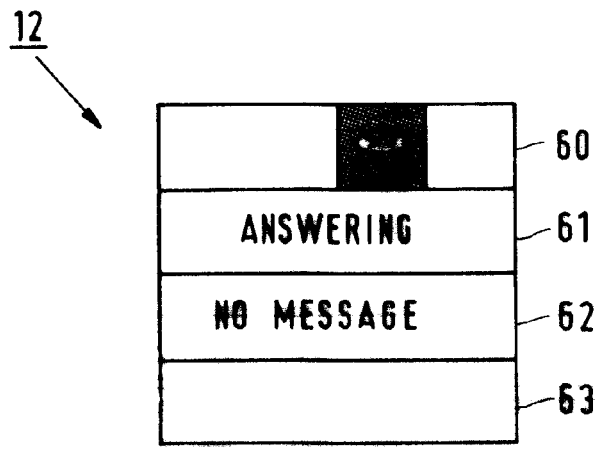

When "answering apparatus" is selected, a sub-menu with the selections "listening", "answering", "answering message" becomes available. For listening, a further sub-menu becomes available for selection of various messages received. FIGS. 4, 5 and 6 show different contents of the display screen 12 which occur when such a hierarchical menu structure is used. Each display screen comprises four fields 40, 41, 42, 43; 50, 51, 52, 53; 60, 61, 62, 63.

FIG. 4 shows the contents of the display screen when the upper pushbutton 14a is depressed. The upper line 40 shows four symbols (corresponding to the four selections of the main menu: "on", "telephone list", "answering apparatus" and "text messages", respectively). When the upper pushbutton 14a is depressed, the user can scroll through these symbols by turning the rotary knob 16. During turning, each time another symbol is visually identified by inversion of its intensity pattern. In FIG. 5 the second symbol has thus been visually identified.

When the rotary knob 16 is turned further, the intensity pattern of the second symbol is inverted back again and the intensity pattern of the next symbol is inverted. During further turning, moreover, the contents of the lower lines are replaced, signifying that the series of display items wherethrough the user can scroll changes if he or she depresses the pushbutton 14b–d adjacent one of these lines. FIG. 4 thus shows the contents of the display screen 12 when the user has scrolled as far as the second symbol on the upper line 50, and FIG. 5 shows the contents of the display screen after the user has scrolled further to the third symbol on the upper line 60 with the upper pushbutton 14a in the depressed state. At the same time the contents of the second, the third and the fourth lines 61, 62, 63 also change.

For example, when he or she releases the upper pushbutton 14a when the second symbol has been identified and subsequently depresses the second pushbutton 14b, the user can replace "browse" by "edit" by turning the rotary knob 16; alternatively, when the user depresses the third pushbutton 14c instead of the second pushbutton 14b, he or she can scroll through a series containing a list of names with associated telephone numbers (for example, S. K.Person-123, I. N. Ventor-456, etc.). When a desired name is reached, the user can make the telephone dial the associated number, for example in response to depression of one of the function keys 18a–c. The user can thus scroll directly at any level (line) in the menu, without first having to select intermediate levels.

The display item reached by the user during scrolling ("browse" or "edit", or a given name) is visually identified by displaying this item with exclusion of the other display items in the relevant series.

FIG. 5 shows that after the user has released the button 14a, only the symbol reached during scrolling remains visible on the upper line 50. When the upper button 14a has been released, the rotary knob 16 can no longer scroll through the symbols of the upper line; in order to improve the clarity of the display screen, therefore, the other symbols are no longer displayed after the release.

What is claimed is:

1. A system included on a handheld control device, the system comprising control means provided with a first and a second manual control portion and a display screen, the control means actuating a scroll-enable mode upon actuation of the second manual control portion by a user and, upon the actuating of the scroll-enable mode, the control means being arranged to scroll through a predetermined series of display items in response to actuation of the first manual control portion and to identify visually, each time in response to a scrolling step, a next display item from the series on the display screen, the control means switching to a scroll-disabled mode in response to interruption of actuation of the second manual control portion, the series of display items scrolled being selected from a number of different series of display items by a mode of actuation of the second manual control portion.

2. A system as claimed in claim 1, in which the first manual control portion comprises a rotary disc and scrolling takes place in response to rotation of the rotary disc.

3. A system as claimed in claim 1 in which the second manual control portion comprises a plurality of buttons, each button a mode of actuation of the second manual control portion, the series of display items being selected in response to actuation of the button corresponding to the relevant series.

4. A system as claimed in claim 3, comprising exactly four of said respective buttons.

5. A system as claimed in claim 1, in which the second manual control portion comprises a first and a second button, each button a mode of actuation of the second manual control portion, a first series of display items being selected in response to actuation of the first button, each display item in said first series corresponding to a respective second series of display items, said respective second series being selected in response to actuation of the second button, after prior visual identification of the display item with which the series is associated as the last one in response to the scrolling step.

6. A system as claimed in claim 1 in which a respective corresponding field on the display screen is associated with each series from the number of different series of display items, the next display item always being identified in the field corresponding to the relevant series.

7. A system as claimed in claim 6, in which the display screen is incorporated in the handheld control device.

8. A system as claimed in claim 7, in which the corresponding fields form lines on the display screen which are arranged below one another, each corresponding button being arranged on the handheld control device so as to be adjacent to and in alignment with the associated line, viewed in a front view of the display screen.

9. A system as claimed in claim 1 wherein the handheld control device is a telephone handset in which the control means are coupled to a dialling unit for dialling a number in dependence on the selected display item.

10. A system as claimed in claim 1 wherein the handheld control device is a remote control unit in which the control means are coupled to a transmission unit for the transmission of an instruction to a further apparatus in the system in dependence on the selected display item.

* * * * *